United States Patent
Fuller, III et al.

(10) Patent No.: US 8,078,980 B2
(45) Date of Patent: Dec. 13, 2011

(54) USER DEFINED WIRE APPEARANCE INDICATING COMMUNICATION FUNCTIONALITY IN A GRAPHICAL PROGRAMMING ENVIRONMENT

(75) Inventors: David W Fuller, III, Austin, TX (US); Jacob Kornerup, Austin, TX (US); John R. Breyer, Austin, TX (US)

(73) Assignee: National Instruments Corporation, Austin, TX (US)

( * ) Notice: Subject to any disclaimer, the term of this patent is extended or adjusted under 35 U.S.C. 154(b) by 937 days.

(21) Appl. No.: 12/052,715

(22) Filed: Mar. 20, 2008

(65) Prior Publication Data

US 2009/0241069 A1    Sep. 24, 2009

(51) Int. Cl.
*G06F 3/048* (2006.01)
*G06F 3/00* (2006.01)
*G06F 9/44* (2006.01)
*G06F 17/50* (2006.01)
*G06F 15/04* (2006.01)

(52) U.S. Cl. ........ 715/763; 715/762; 717/105; 716/100; 716/139

(58) Field of Classification Search .................. 715/762, 715/763; 716/139, 100; 717/105
See application file for complete search history.

(56) References Cited

U.S. PATENT DOCUMENTS

| | | | |
|---|---|---|---|
| 4,901,221 A * | 2/1990 | Kodosky et al. | 715/771 |
| 5,610,828 A | 3/1997 | Kodosky et al. | |
| 6,385,765 B1 * | 5/2002 | Cleaveland et al. | 717/100 |
| 6,581,202 B1 | 6/2003 | Tourne et al. | |
| 7,134,086 B2 * | 11/2006 | Kodosky | 715/763 |
| 2003/0071844 A1 * | 4/2003 | Evans | 345/763 |
| 2004/0031019 A1 * | 2/2004 | Lamanna et al. | 717/125 |
| 2004/0034696 A1 * | 2/2004 | Joffrain et al. | 709/217 |
| 2006/0053409 A1 * | 3/2006 | Kornerup et al. | 717/109 |
| 2006/0117302 A1 | 6/2006 | Mercer et al. | |
| 2007/0044030 A1 * | 2/2007 | Hayles | 715/762 |
| 2007/0067731 A1 * | 3/2007 | Hiroi et al. | 715/765 |
| 2008/0034079 A1 | 2/2008 | Kodosky et al. | |
| 2009/0113332 A1 * | 4/2009 | Farahmand et al. | 715/771 |

* cited by examiner

*Primary Examiner* — Ting Lee
(74) *Attorney, Agent, or Firm* — Meyertons Hood Kivlin Kowert & Goetzel, P.C.; Jeffrey C. Hood; Mark S. Williams

(57) ABSTRACT

System and method for configuring a wire appearance in a graphical programming environment. A first data type (or class), or communication functionality between nodes, e.g., timing, or data transfer, e.g., data transfer semantics, mechanism, or medium, in a graphical program is specified in response to user input. A first wire appearance denoting the first data type or specified functionality is created in response to user input, including, e.g., a specified wire pattern, thickness, shape, color(s), portion of the wire to be configured with the first wire appearance, wire label and/or wire icon to be displayed on or near the wire. A graphical program including a first icon and a second icon is created, including connecting the first icon to the second icon in response to user input, and displaying a wire between the first icon and the second icon in response, where the wire has the first wire appearance.

21 Claims, 14 Drawing Sheets

USER DEFINED WIRE APPEARANCE INDICATING COMMUNICATION FUNCTIONALITY IN A GRAPHICAL PROGRAMMING ENVIRONMENT

FIELD OF THE INVENTION

The present invention relates to the field of graphical programming, and more particularly to a system and method for configuring a wire appearance in a graphical programming environment.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/ or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

In the course of developing graphical programs, users may desire to define first data types or to specify communication functionality, e.g., data transfer functionality or timing, e.g., between nodes in the graphical program. In some graphical programming systems, a wire connecting an output of one node to another node in the graphical program may be considered to have or be associated with the data type of the node output. However, in prior art graphical programming systems, such wires either all have the same appearance, or have some default appearance, and there is no way for a user to specify the appearance of wires associated or used with user-defined data types or classes. Similarly, there are no current means a user to specify a wire appearance to indicate a specified communication functionality.

Thus, improved systems and methods for specifying graphical programs desired.

SUMMARY OF THE INVENTION

Various embodiments of a system and method for configuring a wire appearance in a graphical programming environment are presented. The wire appearance may be at least partially (or completely) unique or specific to a certain wire type, e.g., wire data type, or a specified communication functionality. Thus the appearance of this wire in a graphical program provides a visual indication to the user as to the nature of the wire, e.g., the type of data being conveyed on the wire and/or the communication functionality of the wire.

In one embodiment, a first data type may be created in response to user input. The first data type may be any type desired by the user. For example, the first data type may be a type of cluster, a class, or any other type of data or data structure. The first data type may be created in any of a variety of ways. For example, the user may invoke a tool to create the first data type.

A first wire appearance for the first data type (or class) may be created in response to user input. In preferred embodiments, creating the first wire appearance may include displaying a graphical user interface (GUI) for configuring the first wire appearance, receiving user input to the GUI specifying one or more of a wire pattern, a wire thickness, a wire shape, and/or one or more wire colors, and creating the first wire appearance in accordance with the user input to the GUI. Note that other appearance attributes may be included as desired, including, for example, a shape, a 3D appearance, a tube appearance, a separated appearance (e.g., a "dashed" wire), a curved appearance, or an "extrusion shape", e.g., "rectangular cross-section", among others. In other words, any visual aspect of the wire may be used as desired to denote the specified data type (e.g., class) of the wire.

A graphical program may be created, e.g., on the computer system (or on a different computer system), e.g., by the user arranging on a display a plurality of nodes or icons and then interconnecting the nodes to create the graphical program, automatically, or via any other graphical program creation methods desired. Creating the graphical program may include including a first icon and/or second icon which is operable to generate and/or receive the first data type and connecting the first icon to the second icon in response to user input. In response to the connecting, a wire may be displayed between the first icon and the second icon, where the wire has the first wire appearance. In other words, the wire that connects the first icon or node to the second icon or node may be displayed with the wire appearance specified by the user mentioned above.

While the above embodiments are directed to defining and configuring wire appearance based on a user-defined data type or class, in other embodiments, the user may define and configure wire appearance based on other attributes, or more generally, based on specified functionality for communication between nodes in a graphical program. Thus, for example, first communication functionality between nodes in a graphical program may be specified in response to user input.

In various embodiments, specifying first communication functionality between nodes may include any of a plurality of communication functionalities, including, for example, timing, and/or data transfer, among others. Thus, for example, the user may provide input specifying communication of timing information between the nodes as opposed to data transfer (or, alternatively, data transfer between the nodes, as opposed to timing). Specifying timing may include, for example, specifying a clock, e.g., a source for a clock signal, specifying a timing signal, or specifying whether a leading or trailing edge of the clock or timing signal is to be used, among others. In other words, specifying timing may include specifying any attributed of timing functionality, as desired. Specifying data transfer may include specifying data transfer semantics, a data transfer mechanism, and/or a data transfer medium. Data transfer semantics refers to the manner, e.g., policy, of data transfer, e.g., synchronous, asynchronous, first-in, first-out (FIFO), buffered, etc., and where data transfer mechanism refers to how the semantics are implemented, e.g., via direct memory access (DMA), TCP/IP, shared memory, tags, and so forth. Thus, for one example, the user may specify that data are to be communicated between two nodes asynchronously, and may also specify that this asynchronous data transfer be implemented via a particular data structure, e.g., a queue implemented via a linked list. Specifying a data transfer medium, which may also be referred to as a data transport medium, may specify the physical medium by which the data are transferred, e.g., physical media such as wires, buses, Ethernet, etc., and/or wireless means, among others.

A first wire appearance may be created in response to user input, where the creating includes storing the first wire appearance. The first wire appearance is useable to be displayed for a wire in a graphical program that is configured to implement the specified first communication functionality, and visually denotes the specified first communication functionality of the wire. The user may define a wire appearance for a certain wire/wire functionality via a GUI, as described above. For example, the user may use a graphical user interface as described above to create a wire appearance that is unique or specific to the configured wire communication functionality.

In one embodiment, specifying communication functionality between nodes may include specifying functionality of at least one endpoint of the wire. For example, the behavior or mechanism of the "source" or "destination" end of the wire may be specified. Thus, for example, a wire that is buffered may be specified to validate any data from the data source (node) before placing the data on the wire, i.e., the behavior of the "source" end of the wire may be specified. As another example, the "destination" end of the wire may be specified to output default values if no data are currently on the wire. As an example of specifying data transfer mechanisms, the "source" end of the wire may be specified to communicate with the source node via TCP/IP, while the "destination" end of the wire may be specified to communicate with the destination node via register access.

In some embodiments, the first wire appearance may be a specified appearance of a portion of the wire proximate to the at least one endpoint of the wire. In other words, some aspects of the wire's appearance may be specific to the end or ends, and may denote functionality thereof. Thus, depending upon the specified functionality or functionalities of the wire, various portions of the wire may be displayed with respective appearances, e.g., patterns, colors, thicknesses, shapes, labels, icons, decorations, etc., as desired, to denote respective communication functionalities of the wire. Thus, creating the first wire appearance for the first communication functionality may include displaying a graphical user interface (GUI) for specifying the first wire appearance, and receiving user input to the GUI specifying one or more of: a wire pattern, one or more wire colors, a wire thickness, a wire shape, at least a portion of the wire to be configured with the first wire appearance, a wire label, and/or a wire icon to be displayed on or near the wire, and creating the first wire appearance in accordance with the user input to the GUI.

A first graphical program may be created, where the first graphical program includes a plurality of interconnected icons which visually indicate functionality of the first graphical program, including a first icon and a second icon. Creating the first graphical program may include connecting the first icon to the second icon in response to user input, and displaying a wire between the first icon and the second icon in response to the connecting, where the wire has the first wire appearance denoting or indicating the specified first communication functionality.

Thus, various embodiments of the above systems and methods may allow a user to define or specify data type and/or communication functionality for communication between two nodes in a graphical program, as well as a first wire appearance indicating, representing, or denoting the specified data type or communication functionality. The first wire appearance may then be used in a graphical program to visually indicate wires with that data type or functionality.

BRIEF DESCRIPTION OF THE DRAWINGS

A better understanding of the present invention can be obtained when the following detailed description of the preferred embodiment is considered in conjunction with the following drawings, in which.

Figure 1A:
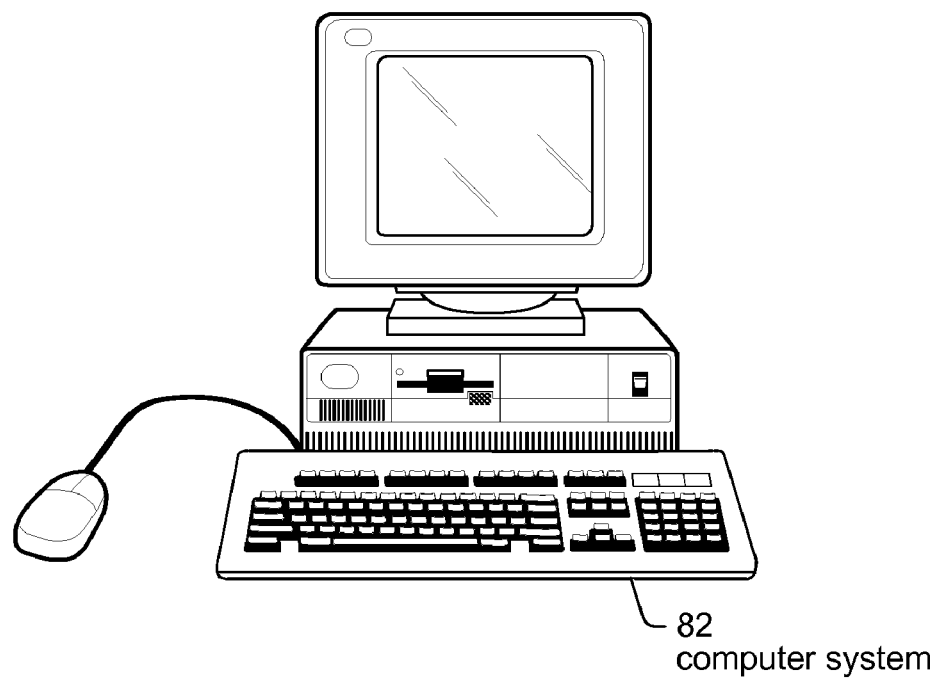
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 11/462,393, titled "Asynchronous Wires for Graphical Programming", filed Aug. 4, 2006.

U.S. patent application Ser. No. 11/759,975, titled "Graphical Diagram Which Automatically Determines a Data Transport Mechanism For Wires Based On Configured Policies", filed Jun. 8, 2007.

U.S. patent application Ser. No. 11/759,979, titled "Graphical Diagram Wires Whose Appearance Represents Configured Semantics", filed Jun. 8, 2007.

U.S. patent application Ser. No. 11/759,985, titled "Configuring Icons to Represent Data Transfer Functionality", filed Jun. 8, 2007.

U.S. patent application Ser. No. 11/759,991, titled "Diagram with Configurable Wires", filed Jun. 8, 2007.

U.S. patent application Ser. No. 11/743,418, titled "Configurable Wires in a Statechart", filed May 2, 2007.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Data Type—a classification of a particular type or representation of information. Data types may be intrinsic to a programming language, e.g., integer, character, etc., and/or user-defined, such as, for example, AccountRecord, ChannelName, and so forth. Data types can be atomic, i.e., specifying a single, simple data object, such as an integer, or may be compound, such as an array of integers, a character string, or a user-defined type that includes multiple data elements of the same or different data types. A data type definition specifies the size of an element of that type, e.g., 16-bits, as well as the structure of the element, e.g., the order and content of a compound data type. A data type is a type of data, not the data itself, i.e., data elements of a data type must be instantiated.

Class—a form of compound data type that may specify an ordered list of component data types, and may also include methods (e.g., member functions) that may access and/or operate on the components. In some systems, classes may be heritable, i.e., a "child" class may inherit component data types and methods from a "parent" class, and may add data and/or add to or modify the methods as desired. A class (definition) defines a type of data or object, and is not the object itself, i.e., objects of a class must be instantiated.

Array—a sequential list structure that includes a variable number of zero or more data elements. These elements may be all of the same type (a homogenous array) or of differing types (a heterogeneous array). When the elements are of differing types, there is generally some common parent type from which all the element types are derived, such that the array can be said to be a homogenous array of that common parent type. For example, a list of dogs may include many types of dogs, such as German shepherds, Cocker Spaniels and Dalmatians.

Cluster—a structure that includes a fixed number of multiple data elements, optionally of different data types.

Aggregate—a collection of data elements, e.g., an array or cluster.

Communication Functionality—the functionality of a communicative connection, e.g., a wire, between nodes in a graphical program. Communication functionality may include timing, or data transfer functionality, such as data transfer semantics, a data transfer mechanism, and/or a data transfer medium.

Wire—a graphical representation of data communication between elements in a graphical program. For example, the plurality of nodes or icons in a graphical program may be interconnected by wires. A wire may have or be associated with a data type or communication functionality, and may have an appearance that indicates the data type of data being communicated over the wire or the communication functionality of the wire.

Hardware Configuration Program—a program, e.g., a netlist or bit file, that can be used to program or configure a programmable hardware element.

Graphical Program—A program comprising a plurality of interconnected nodes or icons, where the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, where the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), where the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to various embodiments of the invention described herein. Various embodiments of a method for configuring a wire appearance in a graphical programming environment is described below.

As shown in FIG. 1A, the computer system 82 may include a display device operable to display a graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more graphical programs which are executable to perform the methods described herein. Also, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
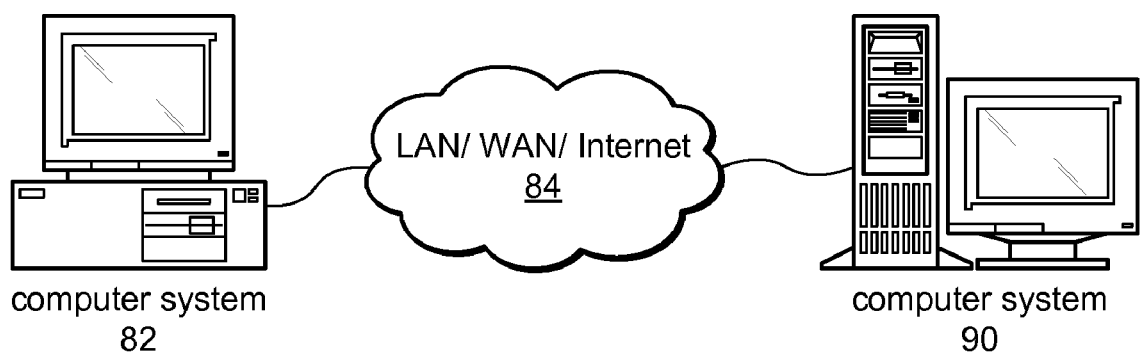
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
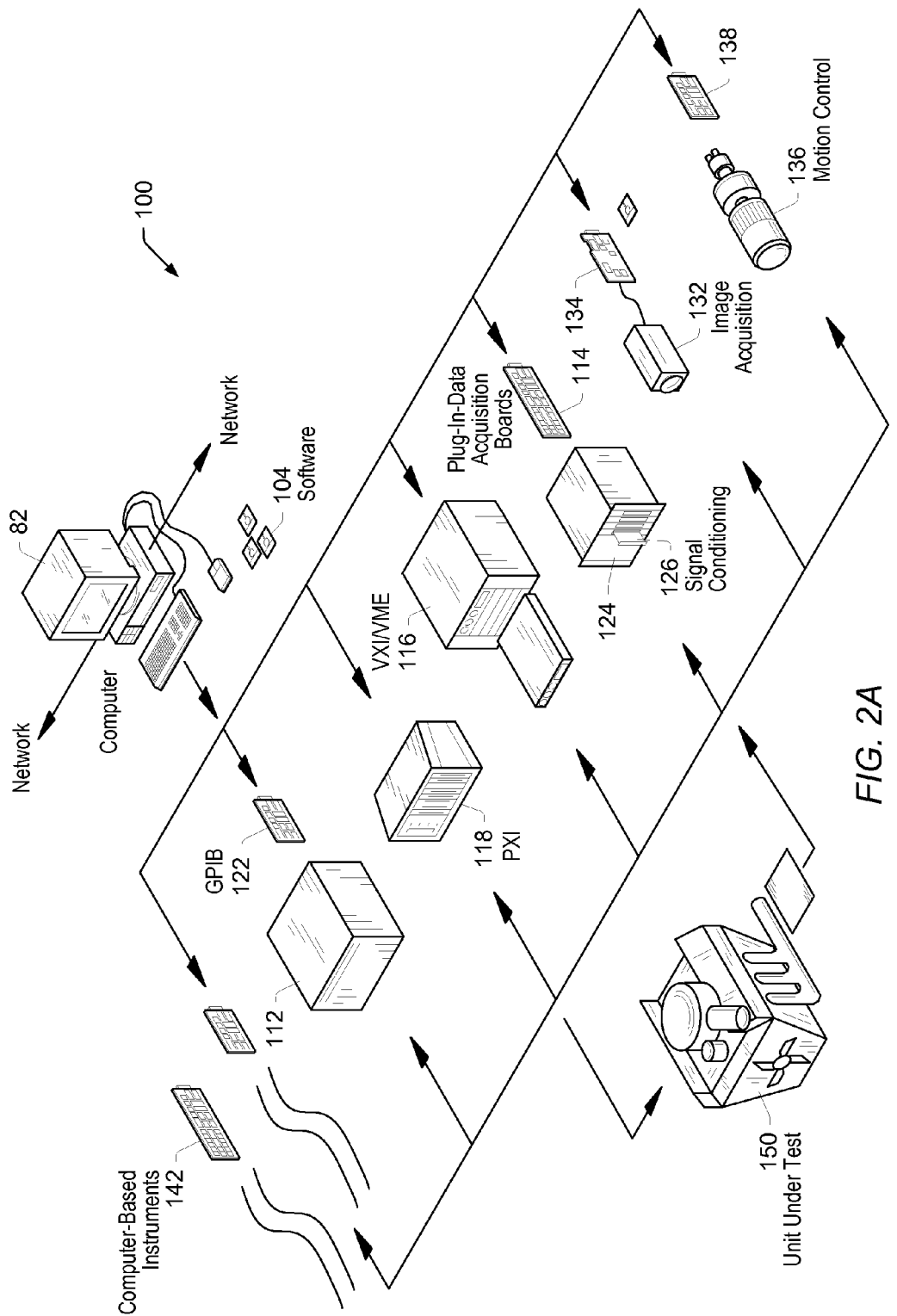
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
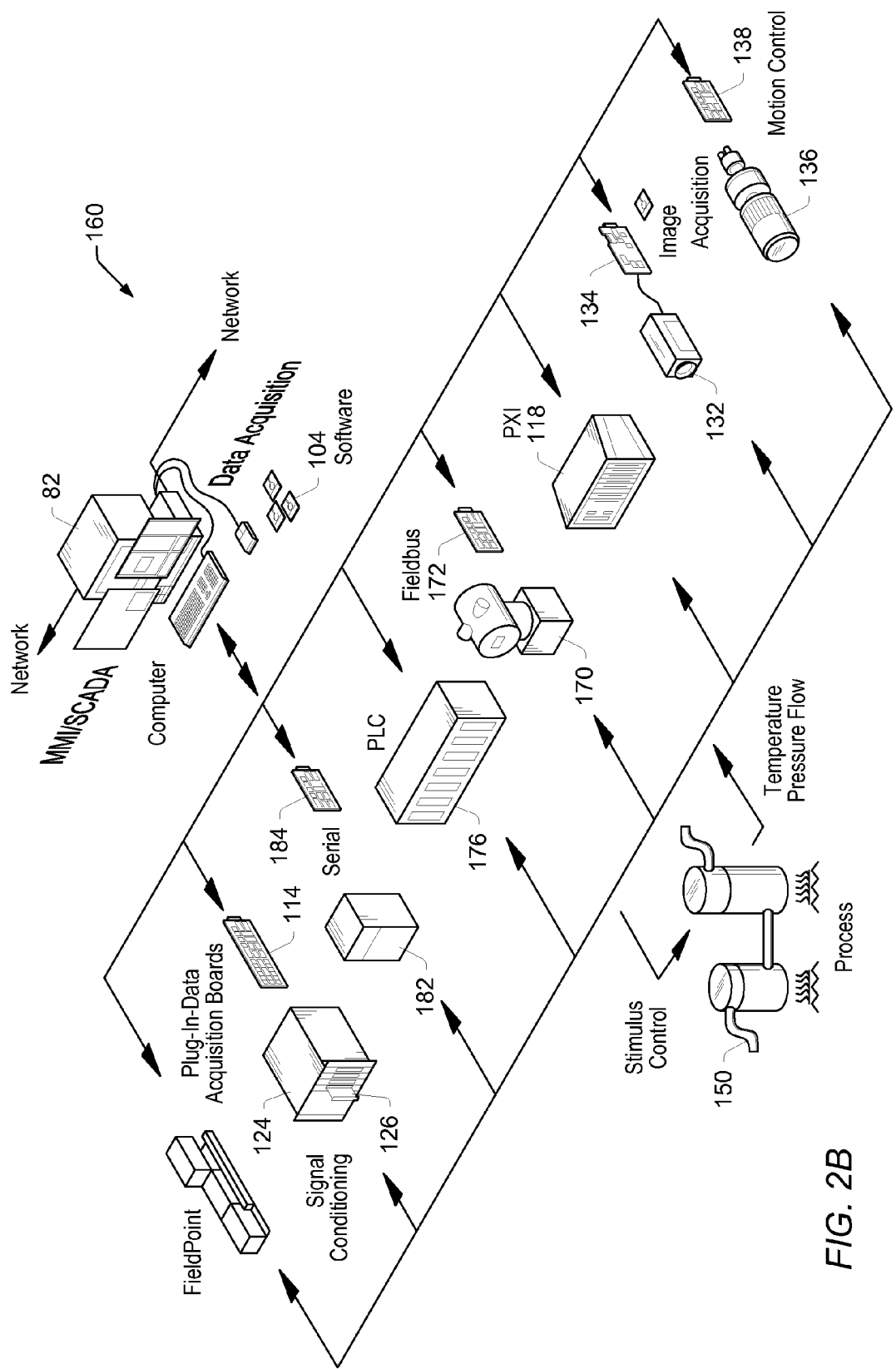
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
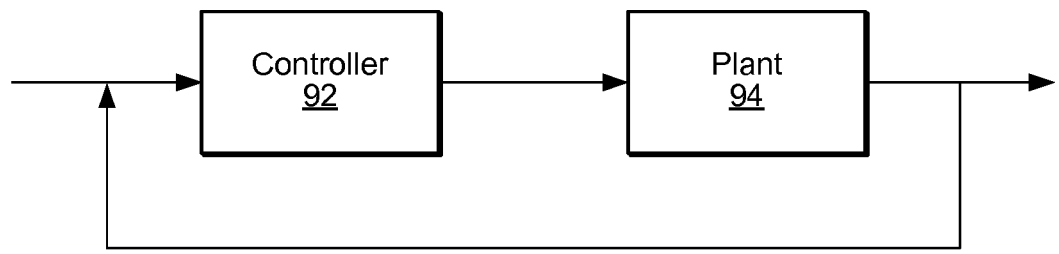
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
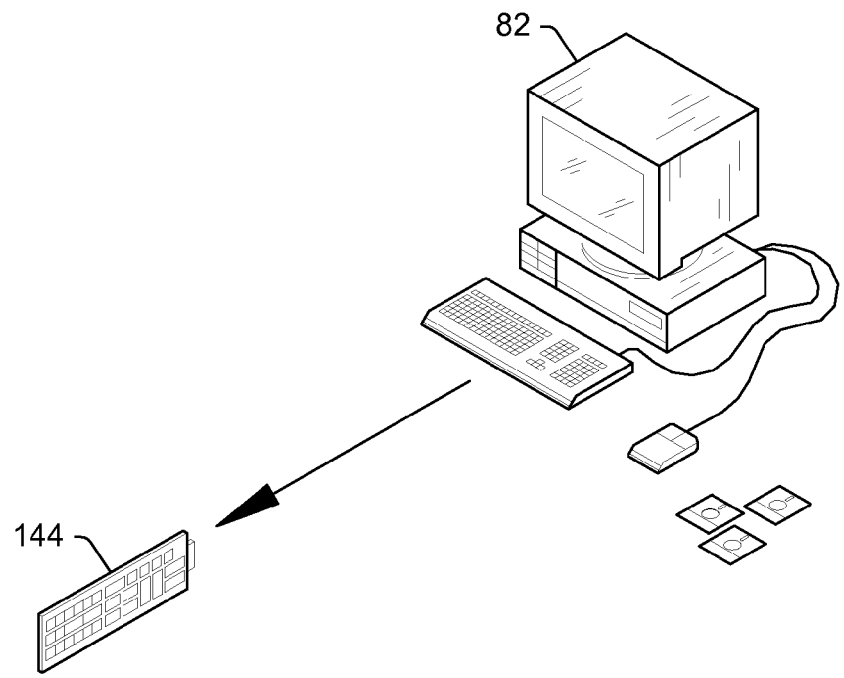
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
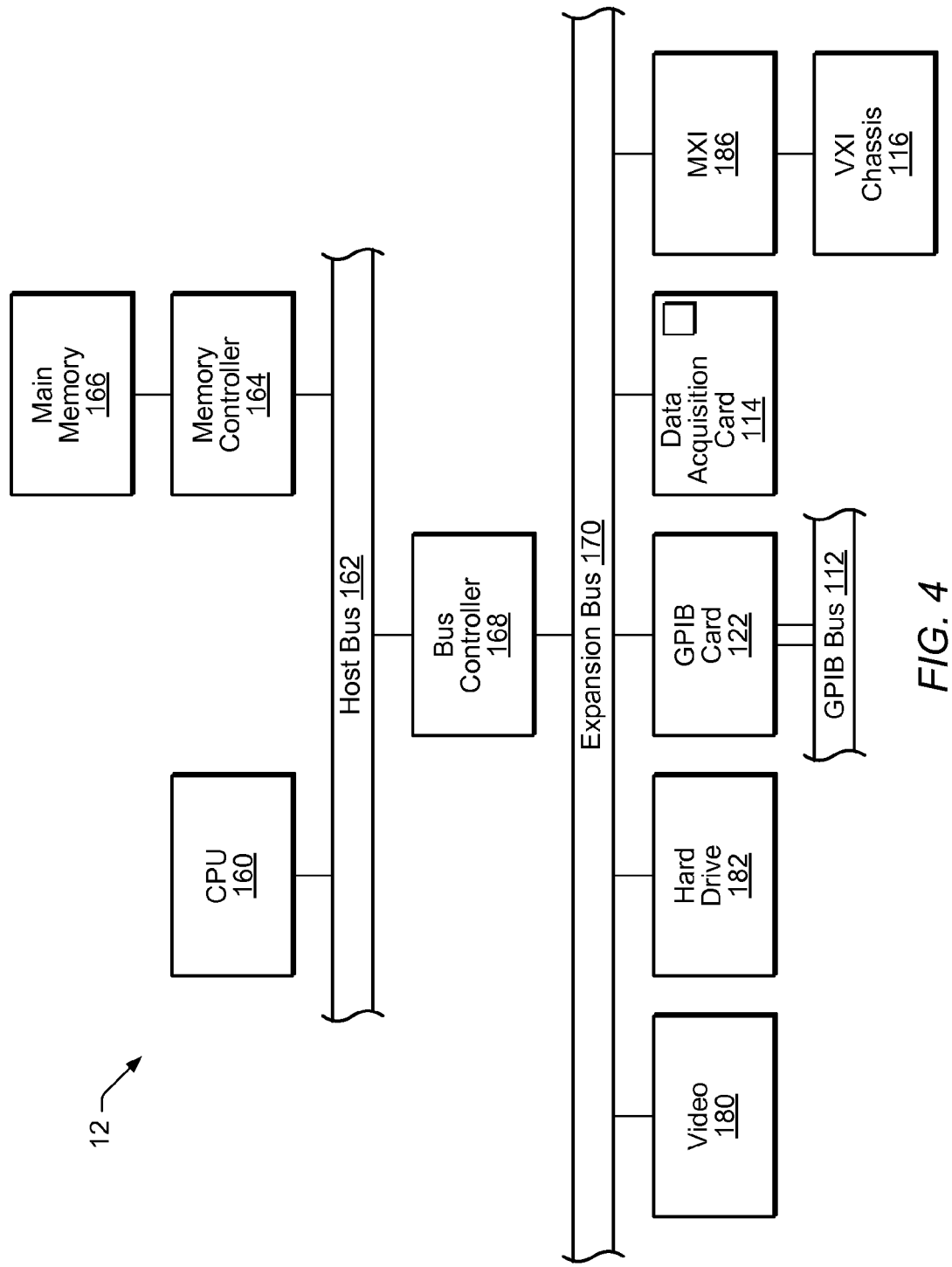
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIGS. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more programs, e.g., graphical programs, implementing various embodiments of the techniques described herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5A:
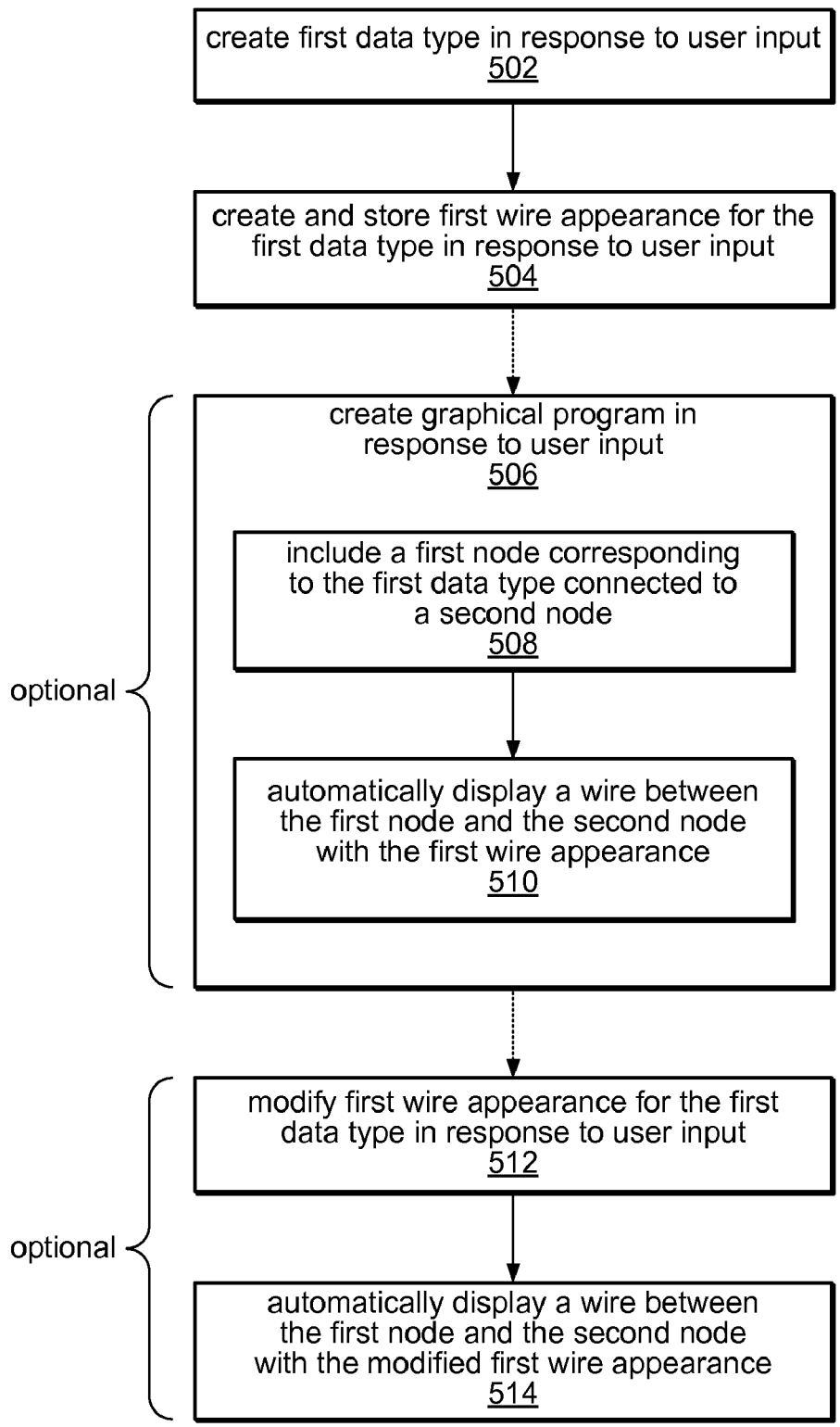
FIGS. 5A and 5B flowchart embodiments of a method for configuring a wire appearance indicating data type in a graphical programming environment.
Figure 5B:
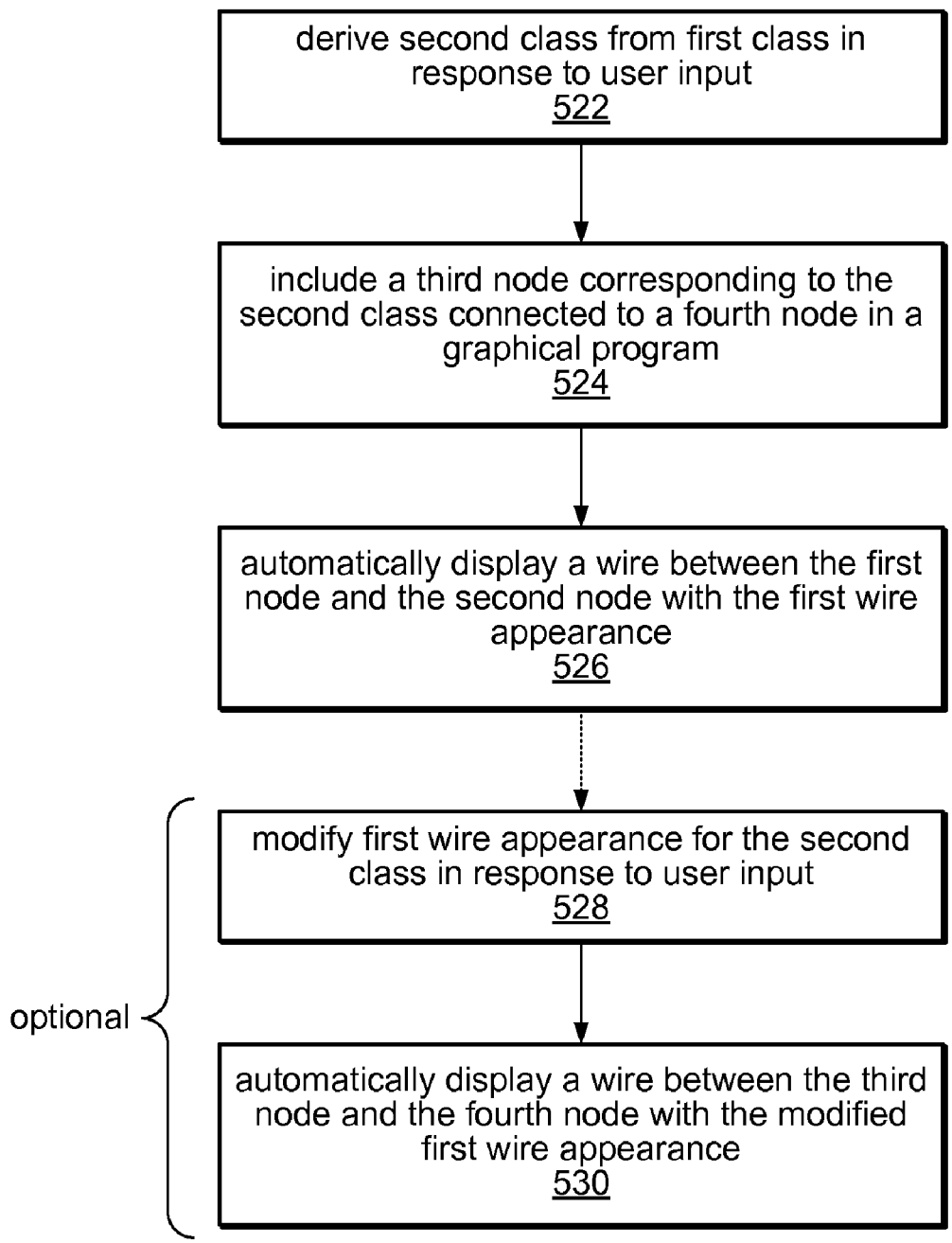

FIGS. 5A and 5B—Method for Configuration of a Wire Appearance for a Data Type FIGS. 5A and 5B illustrate embodiments of a method for configuring a wire appearance to indicate data type in a graphical programming environment. The methods shown in FIGS. 5A and 5B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

As FIG. 5A shows, in 502, a first data type may be created in response to user input. The first data type may be any type desired by the user. For example, the first data type may be a type of cluster, a class, or any other type of data structure. In a preferred embodiment, creating the first data type in response to user input may include creating a first class, where the first class defines the first data type. In an exemplary embodiment, the first data type or class may be an error cluster, where the error cluster may include various data types for communicating and/or characterizing errors, e.g., a Boolean, a numeric, and a string.

The first data type may be created in any of a variety of ways. For example, the user may invoke a tool to create the first data type. In an embodiment where the first data type is a first class, creating the first class may include invoking a class creation tool, where the class creation tool includes a graphical user interface (GUI) for receiving user input specifying the first class. In a preferred embodiment, the class creation tool may include a wizard that is operable to guide the user through creating and specifying the first class. As is well known in the art of programming, a class may include data elements and/or functions or methods for accessing and/or operating on the data elements. Thus, creating the first class may include receiving user input specifying one or more data elements of the first class, and/or one or more functions of the first class. The one or more functions may include one or more graphical programs, where, as defined above, a graphical program comprises a plurality of interconnected nodes or icons which visually indicates the functionality of the program.

In 504, a first wire appearance for the first data type may be created in response to user input, where the creating includes storing the first wire appearance. The first wire appearance is useable to be displayed for a wire in a graphical program that conveys data of the first data type, and visually specifies that the wire conveys data of the first data type. In preferred embodiments, creating the first wire appearance for the data type in response to user input may include displaying a graphical user interface (GUI) for configuring the first wire appearance, receiving user input to the GUI specifying a wire pattern, a wire thickness, a wire shape, and/or one or more wire colors, and creating the first wire appearance in accordance with the user input to the GUI. One embodiment of a GUI for configuring the first wire appearance is described below with reference to FIGS. 6-8. In some embodiments, the GUI for configuring the first wire appearance may be included in or invoked by the class creation tool (or equivalent) described above in 502. Similarly, in some embodiments, the GUI for configuring the first wire appearance and/or the class creation tool may be included in or invoked by or under the graphical program development environment.

Note that other appearance attributes may be included as desired, including, for example, a shape, a 3D appearance, a tube appearance, a separated appearance, a curved appearance, or an "extrusion shape", e.g., "rectangular cross-section", among others. In other words, any visual aspect of the wire may be used as desired to denote the specified data type (e.g., class) of the wire.

In 506, a graphical program may be created, i.e., a first graphical program, e.g., on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons that visually indicates the functionality of the program, as noted above. As also noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 506 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument, although, as noted above, in various embodiments, the graphical program may implement any type of functionality desired. For example, the graphical program may be operable to perform one or more of: an industrial automation function, a process control function, and/or a test and measurement function, among others.

In a preferred embodiment, creating the graphical program may comprise including a first icon which corresponds to the first data type and a second icon in the graphical program and connecting the first icon to the second icon in response to user input, as indicated in 508. In response to the connecting, a wire may be displayed between the first icon and the second icon, where the wire has the first wire appearance, as indicated in 510. In other words, the wire that connects the first icon or node to the second icon or node may be displayed with the wire appearance specified by the user in 504 above.

In one embodiment, creating the graphical program may further include connecting an output of the first icon to a third icon, and displaying a wire between the first icon and the third icon in response to the connecting, where the wire has the first wire appearance. In other words, where the output(s) of the first node is of the first (user-defined) data type, the wire(s) connecting the output(s) to another node(s) may be of or associated with the same data type, and may thus be displayed with the user-specified wire appearance.

Thus, the method may include displaying the first wire appearance for a first wire in a first graphical program, where the first wire conveys data of the first data type, and where the first wire appearance visually specifies that the first wire conveys data of the first data type.

In preferred embodiments, the graphical program may be or include a graphical data flow program, although other types of graphical program are also contemplated, such as, for example, control flow, execution flow, or even state diagrams, among others.

As indicated in 512 and 514 of FIG. 5A, in some embodiments, the method may optionally also include modifying the first wire appearance for the data type in response to user input, and displaying the wire between the first icon and the second icon in response, where the wire has the modified first wire appearance. Thus, after the data type and wire appearance have been created and used in the graphical program, the user may be able to reconfigure or modify the wire appearance, in which case the wire in the graphical program may be automatically updated in accordance with the modified wire appearance specified by the user. The wire appearance may be modified via the same GUI used to create and specify the wire appearance initially, i.e., as described in 504 above.

In preferred embodiments, the first wire appearance of the data type may be inheritable, e.g., as is common in object-oriented systems, and so the first data type may be a user-defined class. As is well known in the art of object-oriented programming, in some systems classes may be used to derive additional classes via inheritance, where a derived class, referred to as a child class, may inherit all of the data types (e.g., member elements), and functions or methods of the original class, referred to as a parent class, and may optionally also include additional data elements and/or methods or functions. Thus, the method of FIG. 5B refers to embodiments where the first data types described above with reference to FIG. 5A are classes (e.g., first classes), and so in the descriptions below, the user-defined data types are referred to as classes.

As indicated in 522 of FIG. 5B, in some embodiments, the method may also include creating a second class (data type) in response to user input, where the second class is derived from the first class, i.e., the first data type of FIG. 5A. A third icon which corresponds to the second class and a fourth icon may then be included in a second graphical program, e.g., by connecting the third icon to the fourth icon in response to user input, as indicated in 524. A second wire may then be displayed between the third icon and the fourth icon in response to the connecting, where the second wire has the first wire appearance. In other words, the first wire appearance associated with the first class/data type may be inheritable, such that a second class/data type derived from the first class/data type may also inherit the wire appearance of the first class/data type.

The user may also be allowed to modify this inherited wire appearance. For example, the method may also include modifying the first wire appearance for the second class in response to user input, and displaying the wire between the third icon and the fourth icon in response to the modifying, where the wire has the modified first wire appearance. Thus, the first wire appearance (associated with the first class) may serve as a default wire appearance for any derived classes based on that first class.

Note that in some embodiments, the modification of the inherited wire appearance may be performed as part of the child class specification, where, for example, the wire appearance for the derived class may be specified prior to inclusion of the connected third and fourth icons in the (second) graphical program, and so the wire connecting the third and fourth icons may be displayed initially with the derived and modified wire appearance. Said another way, the method may include creating a second class/data type in response to user input, where the second class/data type is derived from the first class/data type, and creating a second wire appearance for the second class/data type in response to user input. A third icon which corresponds to the second class/data type and a fourth icon may be included in a second graphical program, including connecting the third icon to the fourth icon in response to user input. A second wire may then be displayed between the third icon and the fourth icon in response to the connecting, where the second wire has the second wire appearance.

It should be noted that the second graphical program mentioned above may be a different graphical program than the graphical program of 506, or may be or include the first graphical program. In other words, the derived class/data type and its wire appearance may be used in the original graphical program, or in a different graphical program, as desired.

Further Data Type Representations

As described above, a user-defined data type or class may be indicated or represented by the appearance of a wire configured to transmit or communicate that data type. Note that the term "data type" refers broadly to any type of data, data structure, or class, while the term "class" refers specifically to data types that are heritable (i.e., inheritable), e.g., as used in object-oriented systems and methodologies. In some embodiments, either in addition to, or instead of, such user-defined wire appearances, user-defined data types may also be represented in other ways. For example, in one embodiment, the data type may include an icon representing the data type. The icon may be displayed in the graphical program to represent a use or instantiation of that data type.

In one embodiment, the graphical program may include a block diagram portion comprising the plurality of interconnected icons, and a user interface portion, e.g., a front panel. Creating the graphical program may include adding or including a data element of the first data type in the graphical program, and displaying the icon of the data type in the graphical program.

Figure 9:
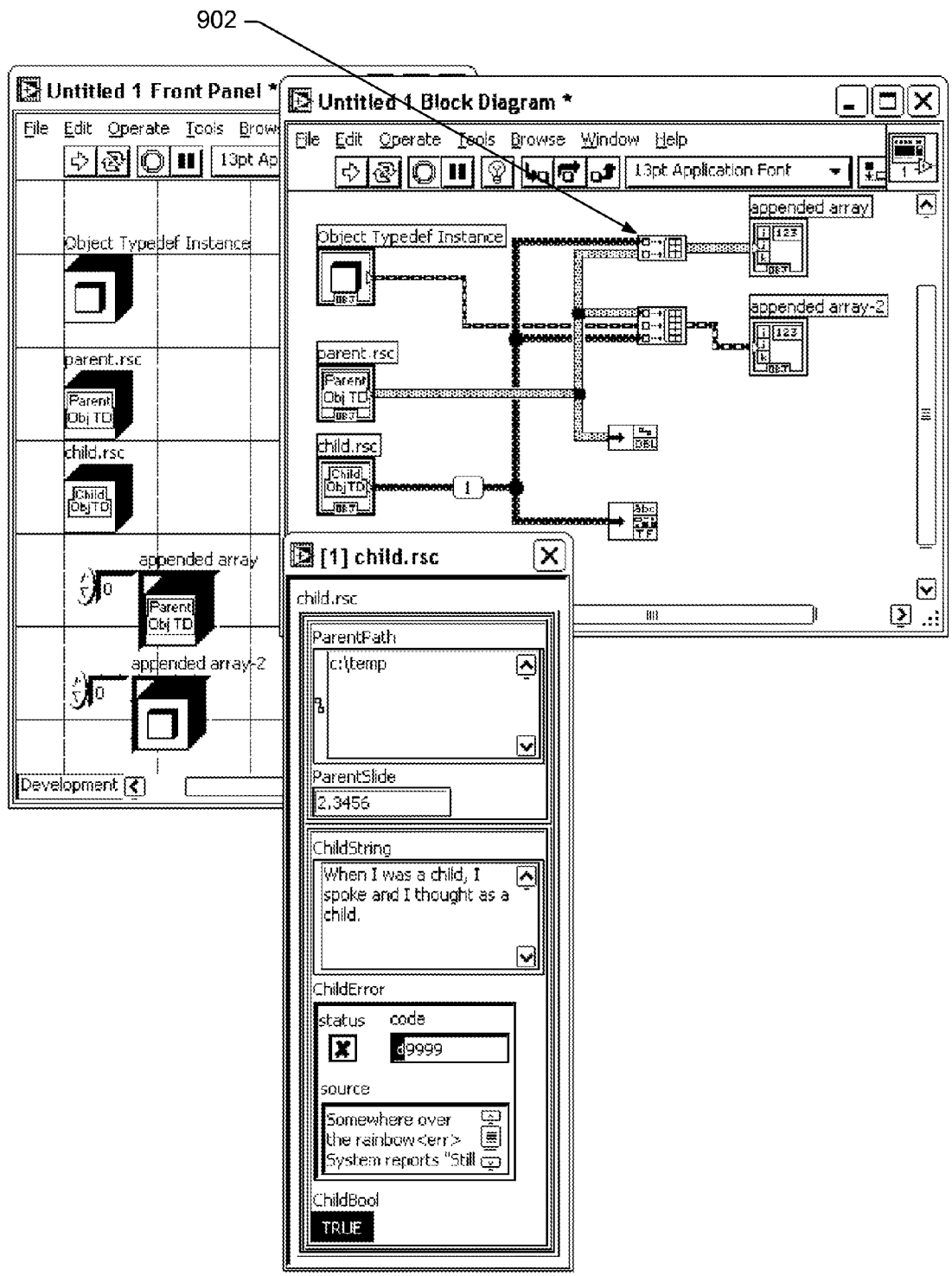
FIG. 9 illustrates an exemplary graphical program utilizing user-defined data types with corresponding wires, according to one embodiment.

As one example, a data element of the first data type may be included as a constant in the graphical program, and the icon displayed in the block diagram portion of the graphical program. As another example, including the data element of the first data type in the graphical program may comprise including the data element as a control or indicator in the graphical program, where displaying the icon of the data type in the graphical program may include displaying the icon in the user interface portion of the graphical program, and displaying a terminal in the block diagram portion of the graphical program corresponding to the icon. In some embodiments, the user may specify or define a control or indicator specifically for the first data type, in which case the icon displayed in the user interface portion of the graphical program may be replaced with the user-defined control or indicator. Examples of this type of icon are illustrated in FIG. 9, described below.

The method may also include executing the graphical program. As indicated earlier, during execution of the graphical program, the graphical user interface may be displayed on a display of a first computer system and the block diagram may execute on a second computer system.

Figure 6:
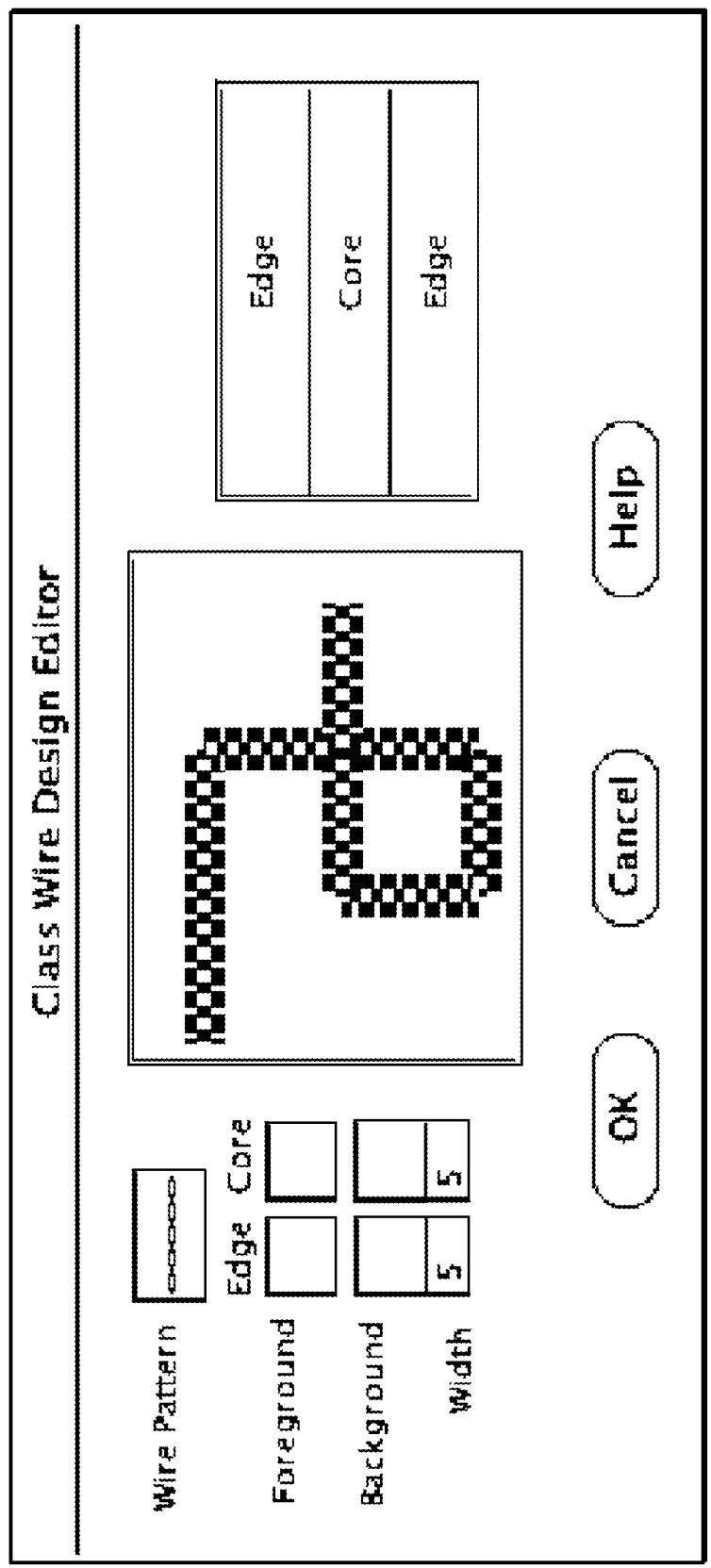
FIGS. 6-8 illustrate a GUI for configuring a wire appearance, according to one embodiment.
Figure 7:
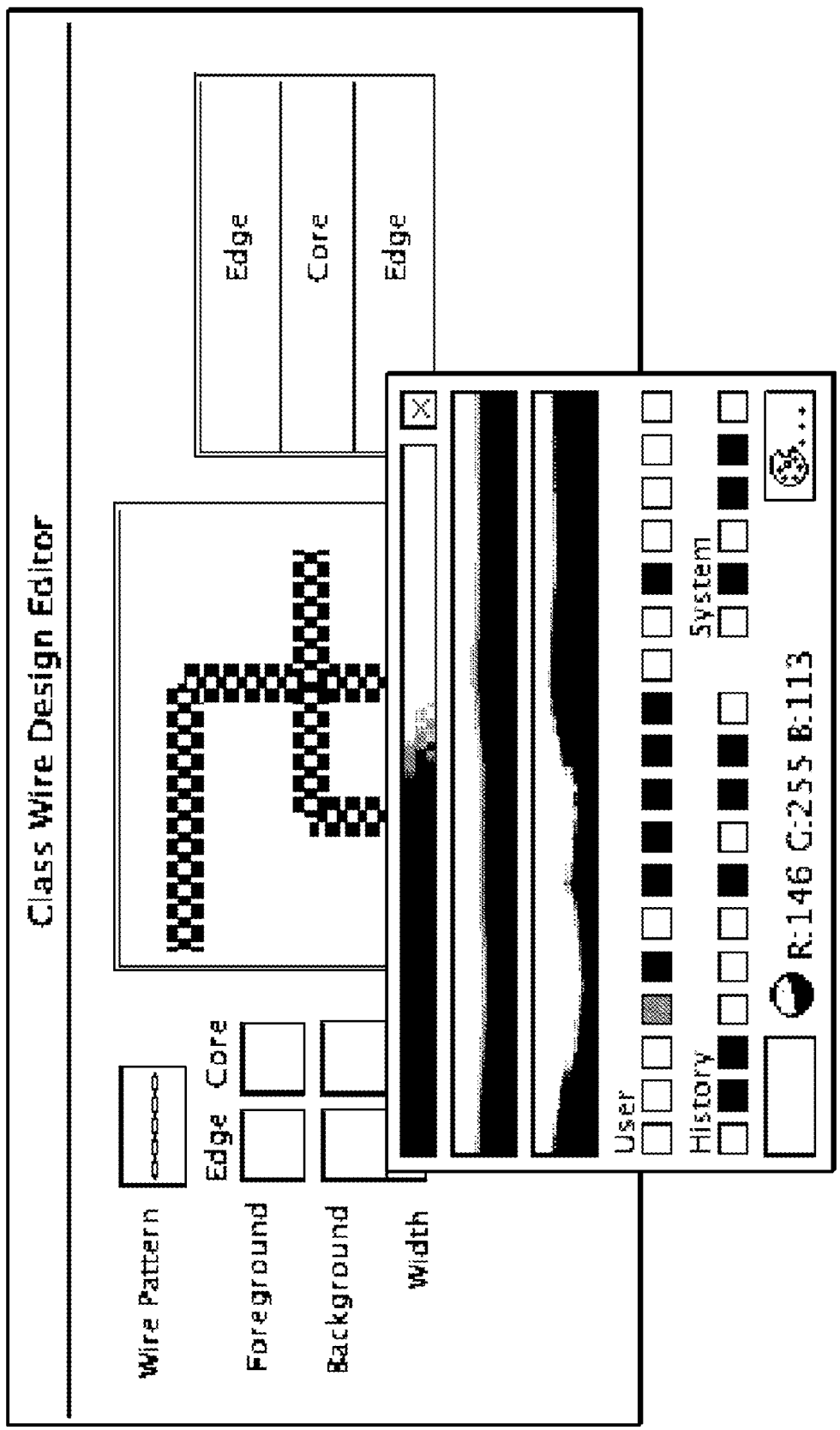
Figure 8:
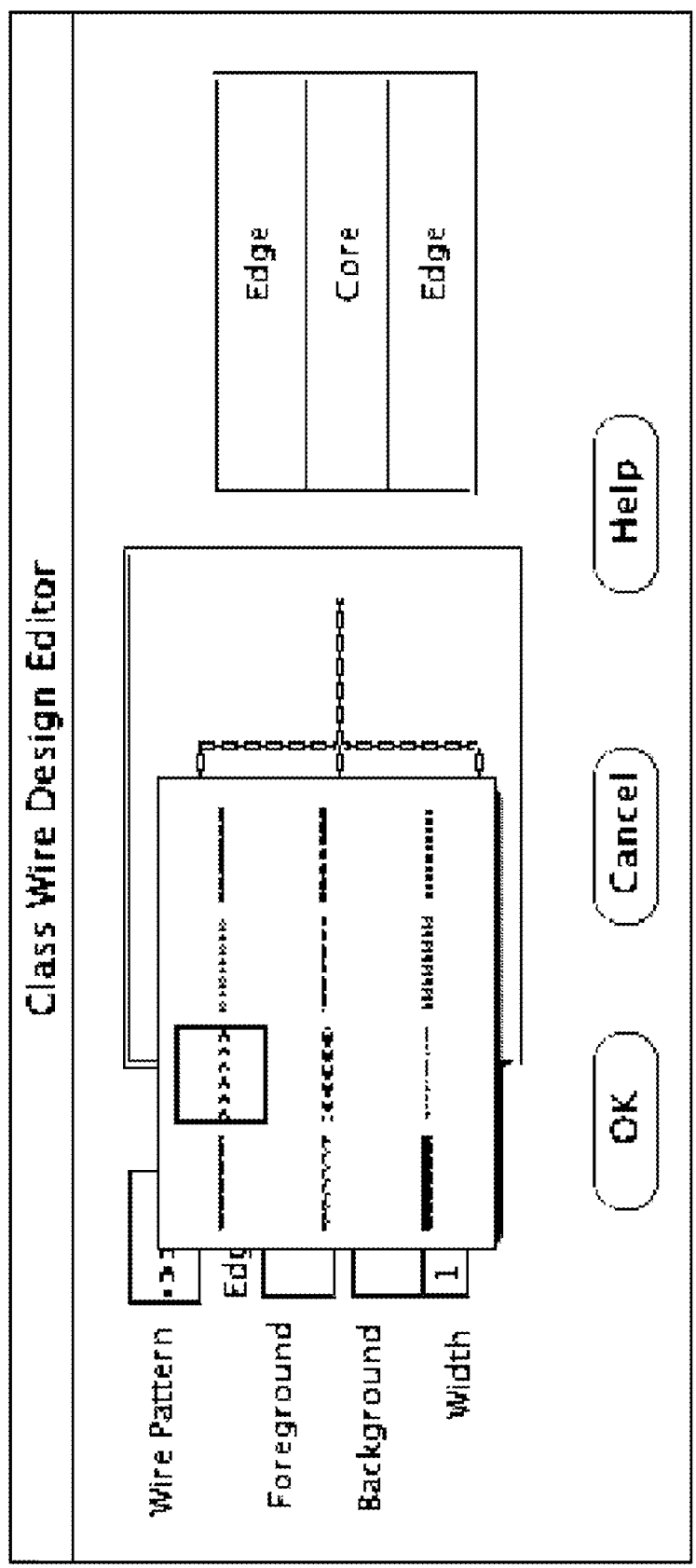

FIGS. 6-9—Example Implementations of Wire Appearance Configuration Based on Data Type FIGS. 6-9 illustrate an example implementation of the methods described above with reference to FIGS. 5A and 5B. More specifically, FIGS. 6-8 illustrate an example GUI for configuring a wire appearance to indicate data type. Note that the embodiments shown are meant to be exemplary only, and are not intended to limit the invention to any particular form, function, or appearance.

FIG. 6 illustrates one embodiment of a GUI for specifying or configuring a wire appearance for a user-defined data type or class. As FIG. 6 shows, in this embodiment, referred to as a "Class Wire Design Editor", the GUI includes a dialog displaying various GUI elements for viewing and configuring wire appearance attributes, e.g., wire pattern and colors. More specifically, in the embodiment shown, in the top left of the dialog a display of the current wire pattern may be seen. Below this, current colors used in the pattern are shown, as well as the pixel width(s) of the pattern, specifically, background color, foreground color, and pixel width for a core and edges of the wire pattern.

In the center of the dialog, an example wire is shown in accordance with the current configuration, and on the far right of the dialog, buttons are provided for editing the core and edges.

FIG. 7 illustrates one embodiment of the GUI of FIG. 6 where a color editor dialog has been invoked to specify a color of an edge or core of the wire. For example, in one embodiment, the color editor dialog may be invoked by clicking with a pointing device (e.g., a mouse) on one of the edit buttons (edge, core, edge) described above, and shown on the right of the Class Wire Design Editor dialog. Alternatively, or in addition to pressing the buttons, the user may invoke the color editor dialog by clicking on the displayed colors. In other embodiments, other means of invocation may be used, such as for example, selecting a menu item from a drop-down menu, and so forth.

As shown, the color editing dialog may receive user input specifying any of a broad range of colors, which may then be applied to the portion of the wire appearance being edited (e.g., an edge or core) Once a color (e.g., for an edge or core) has been specified, the GUI may update the display (e.g., the colors display and the example wire display) to reflect the specified color. This process may be repeated as desired until the colors for the wire are appropriately specified.

FIG. 8 illustrates one embodiment of the GUI of FIG. 6 where a pattern editor dialog has been invoked to specify a pattern for the wire. In various embodiments, the pattern editor dialog may be invoked in various ways, for example, via clicking on the wire pattern display field in the top left side of the GUI dialog, by selecting a menu item from a drop down menu, e.g., from the title bar, and so forth.

As FIG. 8 shows, in this embodiment, the pattern editor dialog may display a plurality of pre-defined wire patterns from which the user may select a desired pattern. Once the desired pattern has been selected, the GUI may display the example wire in accordance with the specified pattern. Note that in the embodiment of FIG. 8, the GUI, including the example wire display and color fields, is shown in grayscale, e.g., so as not to distract the user from the pattern information shown, although in other embodiments, the GUI may maintain the display of colors during the pattern specification process.

In another embodiment, the pattern editor dialog may provide a graphical pixel-wise editor, whereby the user may define a new pattern by binary activation of pixels to specify an "atomic" unit of the pattern. For example, in one embodiment, a blank grid, e.g., an 8×8 pixel grid, may be provided whereby the user may click on the grid at any location to turn a pixel at that location on or off. Once the user has defined the atomic element upon which the pattern is based, the GUI may replicate the atomic element in sequential fashion to create a pattern, which may then be displayed and/or saved for later use. In yet another embodiment, the user may use such a pixel-based edit facility to specify the pattern and to specify the colors in the pattern.

It should be noted that presentation of a limited set of patterns in a menu for selection by the user is only one option contemplated, and that more general editors for creating arbitrary wire patterns are also possible and within the scope of this invention. For example, in various embodiments, new wire appearance patterns may be imported from other programs or systems, or may be created and/or modified by users, e.g., from "scratch" as desired.

FIG. 9 illustrates one embodiment of a graphical program, including a block diagram, labeled "Untitled 1 Block Diagram", and a front panel, labeled "Untitled 1 Front Panel", where various user-defined classes are used, and where various wire appearances are displayed for the classes. Also shown is an example wire probe dialog for examining data on a wire, briefly described below. It should be noted that the examples shown in FIG. 9 are meant to be exemplary only, and are not intended to limit the invention to any particular organization, functionality, or appearance. For example, while LabVIEW classes and objects may be referred to in some of the descriptions below, these are meant to be exemplary only, and are not intended to limit the classes, objects, data structures, and/or data types contemplated to any particular set or development system. Note also that elements shown in FIG. 9 that are not germane to present invention are not described.

As FIG. 9 shows, the front panel includes various controls and indicators corresponding to usages of corresponding classes in the block diagram, including a control labeled "parent.rsc", seen second from the top in the front panel, and another control labeled "child.rsc", just below the parent control. It should be noted that the names "parent" and "child" are meant to be illustrative only, indicating the inheritance relationship between corresponding classes. The parent control is operable to contain or store an instance of a user-defined class, in this case, class "parent.rsc", or any descendents of the parent class, and the child control is operable to contain or store an instance of a user-defined class "child.rsc", which is derived from the parent class, as well as any descendents of the child class.

As shown in the block diagram, a terminal labeled "parent.rsc" and corresponding to the parent control is connected to a thick gray patterned wire, presumably configured by the user for this parent class, and with an appearance specified for the "parent.rsc" class. This wire connects the parent.rsc terminal to a build array node 902, which is configured to receive two inputs of the parent class (and/or a descendent class) and output an array of the same class. A similar wire connects the build array node 902 to an appended array terminal, so labeled, which is associated with a corresponding appended array indicator on the front panel, also labeled "appended array", which operates to store the array once it has been created by the build array node. As may also be seen, a terminal labeled "child.rsc" and corresponding to the child control is connected to a thick dark wire, configured for this child class, and with an appearance specified for the "child.rsc" class. This wire connects the child.rsc terminal to the build array node 902, and provides elements of the child.rsc class as input to the build array node. The build array node 902 operates to receive elements of both parent.rsc and child.rsc classes, and produces an array containing the elements.

Note that the wire connecting the build array node 902 to the appended array terminal has the same appearance as that from the parent.rsc terminal; this is because the type of the created array is that of the nearest common ancestor class of the inputs in order to store elements of different types/classes (i.e., parent.rsc and child.rsc classes), which in this case, is the parent.rsc class. Said another way, since the appended array includes data elements of the parent and child classes, the wire is of the parent class, and so has an appearance corresponding to that class.

Note also that the wire connecting the build array node 902 to the appended array terminal is slightly thicker than that connecting the parent terminal to the build array node 902, due to the increased dimensionality of the data on the wire. In other words, the wire appearance corresponds to the dimensionality or number of elements of the data on the wire. Note further that the appended array indicator on the front panel has an icon indicating the parent class.

Note that the wire connected to the child terminal also has a probe on it, denoted by the number "1". This probe corresponds to the panel labeled "[1] child.rsc", which, during execution of the graphical program, displays the data on this wire. The probe shows the complete data for a child class which includes, as shown, all data from the parent class (a file path named ParentPath and a floating-point numeric value named ParentSlide) and all data added by the child class (the remaining three data elements of ChildString, ChildError, and ChildBool).

Thus, each of the data types, including user-defined data types and/or classes, may have a corresponding wire appearance, and may also have a corresponding icon, for representation on the block diagram, and, in the case of the icons, on the front panel as well. As shown in FIG. 9 and described in detail above, data types or classes may inherit wire appearances from parent classes, and these wire appearances may be over-ridden. In other words, a class (child) may inherit its parent's wire appearance as a default, but this default wire appearance may be modified or reconfigured by the user to provide a custom user-defined wire appearance for the child class. This child class, along with its user-defined wire appearance, may then be used to derive further descendent classes as desired.

Thus, various embodiments of the techniques described above may enable a user to specify, configure, and re-configure, a wire appearance for a wire associated with a user-defined data type or class in a graphical programming environment.

Further Embodiments

The above embodiments are directed to defining and configuring wire appearance based on a user-defined data type or class; however, in other embodiments, the user may define and configure wire appearance based on other attributes, e.g., based on specified functionality for communication between nodes in a graphical program.

Figure 10A:
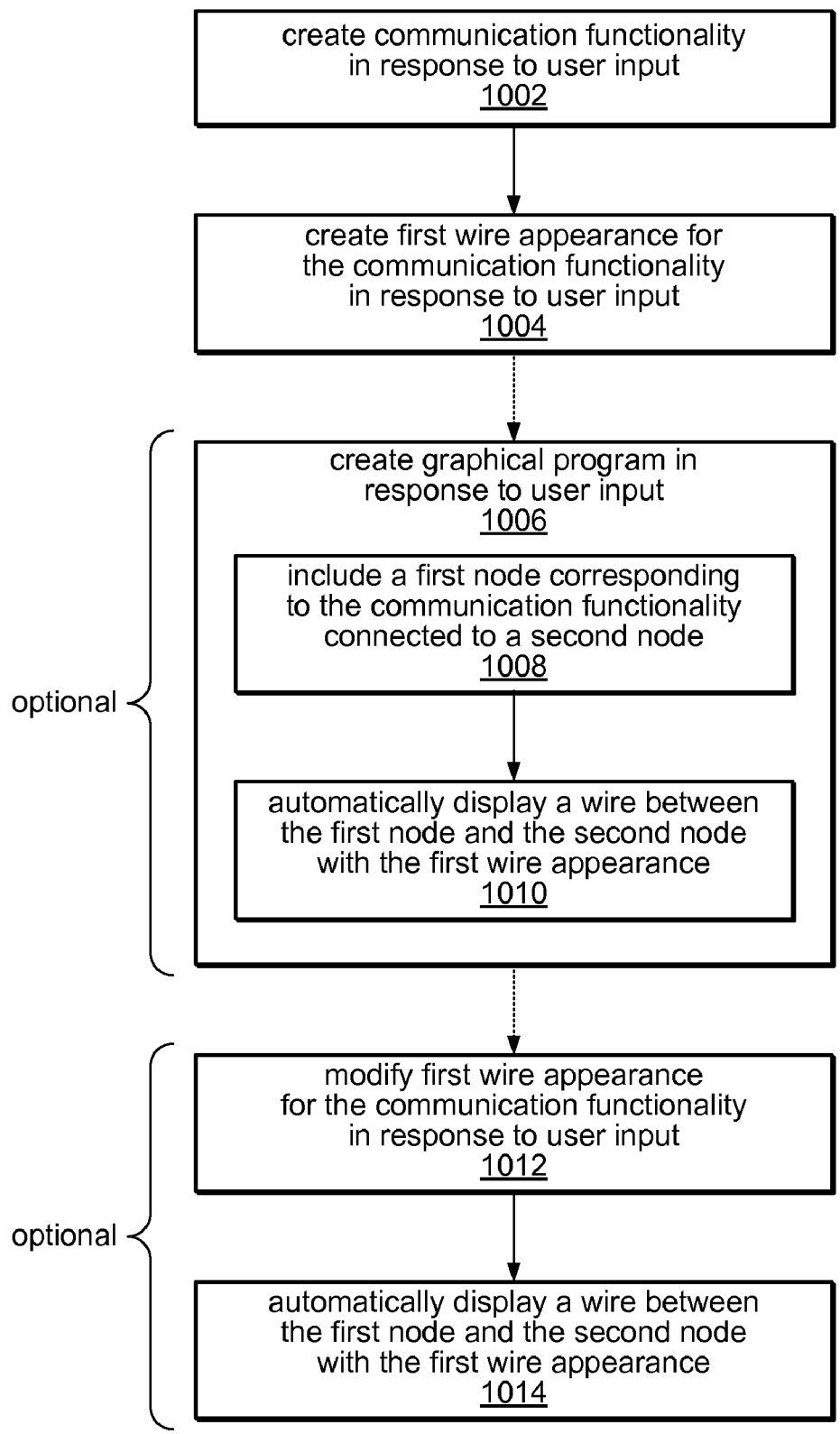
FIGS. 10A and 10B flowchart embodiments of a method for configuring a wire appearance indicating communication functionality in a graphical programming environment.
Figure 10B:
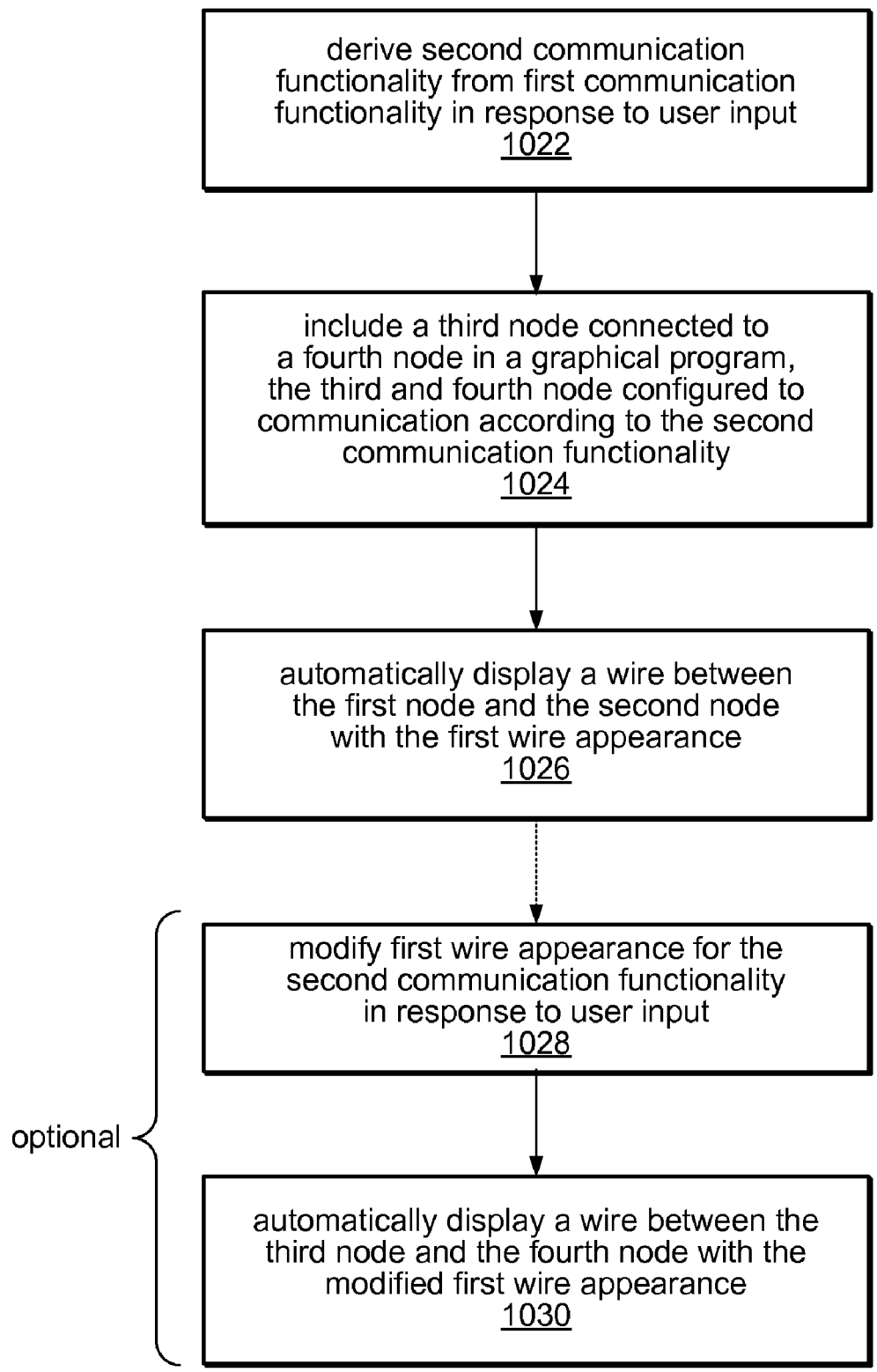

FIGS. 10A and 10B—Method for Configuring a Wire Appearance Indicating Communication Functionality FIGS. 10A and 10B flowchart methods for configuring a wire appearance indicating communication functionality in a graphical programming environment, according to one embodiment. The methods shown in FIGS. 10A and 10B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, the method of FIG. 10A may operate as follows.

As shown in 1002, in one embodiment, first communication functionality between nodes in a graphical program may be specified in response to user input. In various embodiments, specifying communication functionality between nodes may include any of a plurality of communication functionalities, including, for example, timing, or data transfer, among others. Thus, for example, the user may provide input specifying communication of timing information between the nodes as opposed to data transfer (or, alternatively, data transfer between the nodes, as opposed to timing). A GUI may be used to specify the communication functionality.

Specifying timing may include, for example, specifying a clock, e.g., a source for a clock signal, specifying a timing signal, or specifying whether a leading or trailing edge of the clock or timing signal is to be used, among others. In other words, specifying timing may include specifying any attribute of timing functionality, as desired.

Specifying data transfer may include specifying data transfer semantics, a data transfer mechanism, and/or a data transfer medium. Data transfer semantics refers to the manner, e.g., policy, of data transfer, e.g., synchronous, asynchronous, first-in, first-out (FIFO), buffered, etc., and where data transfer mechanism refers to how the semantics are implemented, e.g., via direct memory access (DMA), TCP/IP, shared memory, tags, and so forth. Thus, for one example, the user may specify that data are to be communicated between two nodes asynchronously, and may also specify that this asynchronous data transfer be implemented via a particular data structure, e.g., a queue implemented via a linked list. More information regarding asynchronous (and synchronous) data transfer may be found in U.S. patent application Ser. No. 11/462,393, titled "Asynchronous Wires for Graphical Programming", which was incorporated by reference above.

Thus, in some embodiments, specifying the first communication functionality may include specifying data transfer semantics, which may include specifying the method by which the data may be transferred, e.g., using a circular buffer, register, queues, and/or other buffered semantics, and/or may include specifying a data transfer mechanism, e.g., data transfer protocols, and/or other specifications related to data transfers. Specifying a data transport protocol may specify a method for implementing the data transfer semantics for the wire. For example, the data transport protocol may be the specific protocol used to transmit the data over the data transport medium (e.g., a networked connection, PCI bus, etc.). Exemplary data transport protocols include TCP/IP, USB, DMA, register access, etc. Specifying a data transfer medium, which may also be referred to as a data transport medium, may specify the physical medium by which the data are transferred, e.g., physical media such as wires, buses, Ethernet, etc., and/or wireless means, among others.

Thus, for example, specifying the first communication functionality may include specifying read or write policies for the wire, directionality of the wire (e.g., the direction of data flow), semantics of wire branching, and/or data structures associated with the wire, among others. As another example, in one embodiment, the wire may be specified to provide transport status information. For more information regarding specifying data transport semantics and mechanisms, please see U.S. patent application Ser. No. 11/759,975, titled "Graphical Diagram Which Automatically Determines a Data Transport Mechanism For Wires Based On Configured Policies", and U.S. patent application Ser. No. 11/759,991, titled "Diagram with Configurable Wires", which were incorporated by reference above.

In 1004, a first wire appearance may be created in response to user input, where the creating includes storing the first wire appearance. The first wire appearance is useable to be displayed for a wire in a graphical program that is configured to implement the specified first communication functionality, and visually denotes or indicates the specified first communication functionality of the wire.

Similar to that described above with respect to FIG. 5A above, in preferred embodiments, creating the first wire appearance may include displaying a graphical user interface (GUI) for configuring the first wire appearance, receiving user input to the GUI specifying a wire pattern, a wire thickness, a wire shape, one or more wire colors, at least a portion of the wire to be configured with the first wire appearance, a wire label, and/or a wire icon to be displayed on or proximate to the wire, and creating the first wire appearance in accordance with the user input to the GUI. One embodiment of a GUI for configuring the first wire appearance to denote or indicate the first communication functionality is described below with reference to FIG. 11. In various embodiments, the GUI for configuring the first wire appearance may be included in or invoked by a configuration tool, or may be invoked by or under the graphical program development environment.

Note that other appearance attributes may be included as desired, including, for example, a shape, a 3D appearance, a tube appearance, a separated appearance, a curved appearance, or an "extrusion shape", e.g., "rectangular cross-section", among others. In other words, any visual aspect of the wire may be used as desired to denote the specified communication functionality of the wire. For more information regarding wire appearances, please see U.S. patent application Ser. No. 11/759,979, titled "Graphical Diagram Wires Whose Appearance Represents Configured Semantics", which was incorporated by reference above.

Note that in further embodiments, specifying the first communication functionality may include specifying a model of computation to be followed or implemented by the wire, such as, for example, Kahn Process Networks (PN), or Communicating Sequential Processes (CSP), among others. In other words, in embodiments where a model of computation affects or is affected by communication between nodes, the model of computation for the wire may be specified, and a corresponding appearance used for the wire to denote the specified model of computation.

As indicated in 1006, in some embodiments, a first graphical program may be created, where the first graphical program includes a plurality of interconnected icons which visually indicate functionality of the first graphical program, including a first icon and a second icon. Creating the first graphical program may include connecting the first icon to the second icon in response to user input, and displaying a wire between the first icon and the second icon in response to the connecting, where the wire has the first wire appearance. Note that the graphical program may be created in any of a variety of ways, as discussed above in method element 506 with reference to FIG. 5. In preferred embodiments, the first graphical program may be or include a graphical data flow program, although other types of graphical program are also contemplated, such as, for example, control flow, execution flow, or state diagrams, among others. In one embodiment, the first graphical program may include a block diagram portion comprising the plurality of interconnected icons, and a user interface portion, e.g., a front panel.

Note that in some embodiments, specifying communication functionality between nodes may include specifying functionality of at least one endpoint of the wire. For example, the behavior or mechanism of the "source" or "destination" end of the wire may be specified. Thus, for example, a wire that is buffered may be specified to validate any data from the data source (node) before placing the data on the wire, i.e., the behavior of the "source" end of the wire may be specified. As another example, the "destination" end of the wire may be specified to output default values if no data are currently on the wire. As an example of specifying data transfer mechanisms, the "source" end of the wire may be specified to communicate with the source node via TCP/IP, while the "destination" end of the wire may be specified to communicate with the destination node via register access.

Thus, in some embodiments, the first wire appearance may be or include a specified appearance of a portion of the wire proximate to the at least one endpoint of the wire. In other words, some aspects of the wire's appearance may be specific to the end or ends, and may denote functionality thereof. Thus, depending upon the specified functionality or functionalities of the wire, various portions of the wire may be displayed with respective appearances, e.g., patterns, colors, thicknesses, shapes, labels, icons (e.g., to be displayed on or proximate to the wire, decorations, etc., as desired, to denote respective communication functionalities of the wire.

Thus, in some embodiments, creating the first wire appearance for the first communication functionality includes displaying a graphical user interface (GUI) for configuring the first wire appearance, and receiving user input to the GUI specifying one or more of: a wire pattern, one or more wire colors, a wire thickness, a wire shape, at least a portion of the wire to be configured with the first appearance, a wire label, and/or a wire icon to be displayed on or proximate to the wire, and creating the first wire appearance in accordance with the user input to the GUI.

Thus, in some embodiments, the method may include displaying the first wire appearance for a first wire in a first graphical program, where the first wire implements the specified first communication functionality, and where the first wire appearance visually specifies that the first wire implements the specified first communication functionality.

As indicated in 1012 and 1014 of FIG. 10A, in some embodiments, the method may optionally also include modifying the first wire appearance for the first communication functionality in response to user input, and displaying the wire between the first icon and the second icon in response, where the wire has the modified first wire appearance. Thus, after the first communication functionality and wire appearance have been created and used in the graphical program, the user may be able to reconfigure or modify the wire appearance, in which case the wire in the graphical program may be automatically updated in accordance with the modified wire appearance specified by the user. The wire appearance may be modified via the same GUI used to create and specify the wire appearance initially, i.e., as described in 1004 above.

In some embodiments, the first wire appearance for the first communication functionality may be inheritable. For example, the wire configuration corresponding to the specified first communication functionality may be encapsulated in an inheritable data structure, and so may facilitate a modular approach to wire configuration, including deriving additional wire configurations via inheritance. A derived configuration, which may be referred to as a child configuration, may inherit all of the functional specifications of the original configuration, which may be referred to as a parent configuration, and may optionally also include specification of additional communication functionality. As with the data types/classes embodiments described above, in some embodiments, the wire appearance for a specified communication functionality may be inherited along with the specified communication functionality.

Thus, for example, as indicated in FIG. 10B, in one embodiment, the method may include specifying a second communication functionality between nodes in a graphical program in response to user input, where the second communication functionality is derived from the first communication functionality, as indicated in 1022.

In 1024, a third icon and a fourth icon may be included in a graphical program, where the third icon and the fourth icon are configured to communicate in accordance with the second communication functionality. For example, the third icon may be connected to the fourth icon in response to user input. Then, as indicated in 1026, a second wire may be displayed between the third icon and the fourth icon in response to the connecting, e.g., automatically, where the second wire has the first wire appearance. Thus, the first wire appearance may be used as a "default" wire appearance for communication functionalities derived from the first communication functionality.

Similar to above, in some embodiments, the method may further include modifying the first wire appearance for the second communication functionality in response to user input, and displaying the wire between the third icon and the fourth icon in response to the modifying, where the wire has the modified first wire appearance, as indicated in 1028 and 1030, respectively.

Alternatively, in some embodiments, a second wire appearance for the second communication functionality may be created in response to user input, where, once the third icon is connected to the fourth icon in response to user input, a second wire may be displayed between the third icon and the fourth icon in response to the connecting, where the second wire has the second wire appearance. In other words, the user may create a second wire appearance for the second communication functionality, e.g., overriding the "default" first wire appearance.

As above, the method may further include modifying the second wire appearance for the second communication functionality in response to user input, and displaying the wire between the third icon and the fourth icon in response to the modifying, where the wire has the modified second wire appearance.

As discussed above with reference to FIGS. 6-8, in preferred embodiments, a GUI may be provided whereby the user may create and modify wire appearances. As noted above in the description of the methods of FIGS. 10A and 10B, in some embodiments, a wire appearance may be created for a specified or created communication functionality, and may then be associated with that functionality such that when graphical program nodes are configured to communicate according to the specified communication functionality, the associated wire appearance may automatically be used to display a wire connecting the nodes. In other words, if the nodes are configured according to the specified communication functionality, a wire connecting the nodes may automatically have the wire appearance (whether the connection is performed manually or automatically).

In one embodiment, the GUI may provide means whereby the user may specify the association between the created wire appearance and the specified communication functionality. For example, the GUI may allow the user to search or browse a directory to locate a particular communication functionality, e.g., in the form of a file or data structure, and to select the communication functionality for association with the created wire appearance. Additionally, in further embodiments, the GUI may facilitate creation and/or management of inheritance relationships among communication functionalities and/or wire appearances, discussed above.

Of course, in other embodiments, other means may be used to select and/or associate the wire appearance with a communication functionality, as desired.

Figure 11:
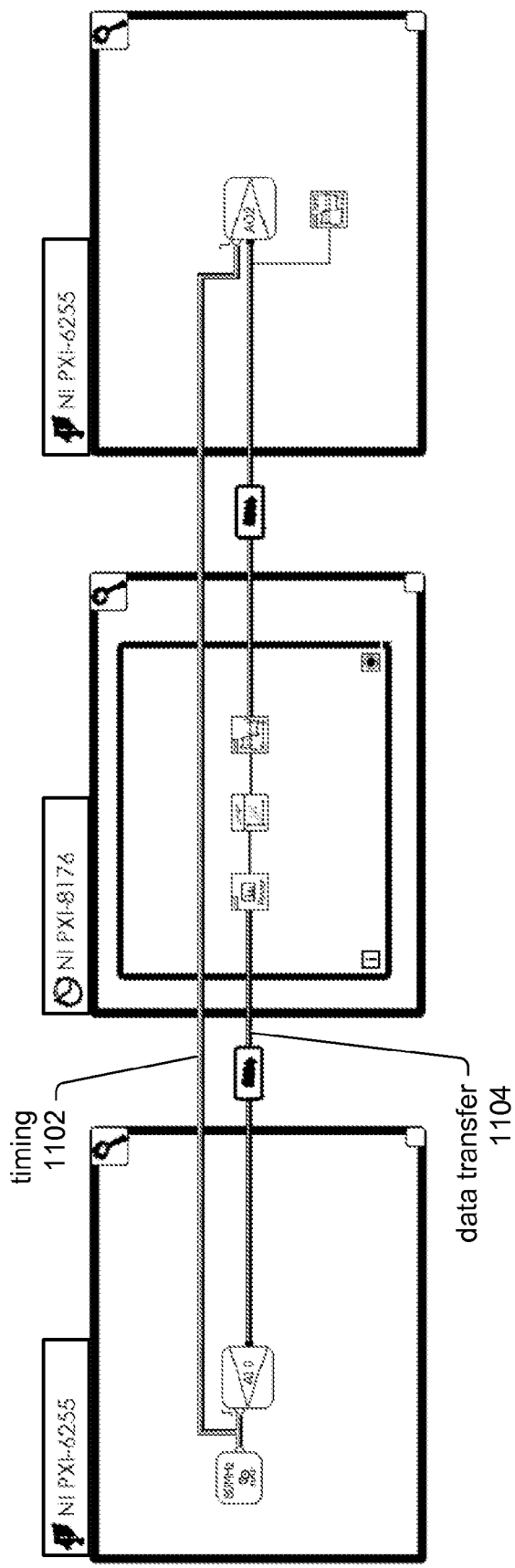
FIG. 11 illustrates an exemplary graphical program utilizing various communication functionalities with corresponding wires, according to one embodiment.

FIG. 11—Exemplary Graphical Program Utilizing Various Communication Functionalities with Corresponding Wires FIG. 11 illustrates one embodiment of a graphical program where various user-defined communication functionalities are used, and where corresponding wire appearances are displayed for the respective communication functionalities.

As FIG. 11 shows, in this exemplary embodiment, the communication functionality of a first wire 1102 has been configured for timing, and the communication functionality of a second wire 1104 has been configured for data transfer. Note that each wire has a distinctive appearance indicating its communication functionality. For example, the timing wire 1102 has a 3D shaded tubular appearance (and may also have a specified color), whereas the data transfer wire 1104 has not only a different wire pattern (and possibly a different color), but also includes an icon indicating the particular data transfer functionality specified for the wire. It should be noted that the examples shown in FIG. 11 are meant to be exemplary only, and are not intended to limit the invention to any particular organization, functionality, or appearance. For further examples of communication functionalities and exemplary associated wire appearances and icons, please see U.S. patent application Ser. No. 11/759,979, titled "Graphical Diagram Wires Whose Appearance Represents Configured Semantics", filed Jun. 8, 2007, which was incorporated by reference above.

Thus, various embodiments of the above systems and methods may allow a user to define or specify communication functionality between two nodes in a graphical program, as well as a first wire appearance indicating, representing, or denoting the specified functionality. The first wire appearance may then be used in a graphical program to visually indicate wires with that functionality.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-accessible memory medium comprising program instructions, wherein the program instructions are executable by a processor to implement:

specifying a first communication functionality between nodes in a graphical program in response to user input defining a new communication functionality;

creating a first wire appearance for representing the first communication functionality in response to user input defining the first wire appearance, wherein said creating comprises storing the first wire appearance to be subsequently used for a wire that is configured to implement the first communication functionality, wherein the first communication functionality comprises one or more of:

timing; or data transfer, comprising one or more of:
   data transfer semantics,
   a data transfer mechanism, or
   a data transfer medium, and subsequently displaying a first wire in a first graphical program, wherein the first wire is configured to implement the specified communication functionality, wherein the first wire is displayed with the first wire appearance, and wherein the first wire appearance visually denotes the specified communication functionality of the wire.

2. The memory medium of claim 1, wherein the program instructions are further executable to implement:

creating the first graphical program, wherein the first graphical program comprises a plurality of interconnected icons which visually indicate functionality of the first graphical program, including a first icon and a second icon, and wherein said creating the first graphical program comprises:
   connecting the first icon to the second icon in response to user input; and
   wherein said displaying the first wire comprises displaying the first wire between the first icon and second icon in response to said connecting.

3. The memory medium of claim 2, wherein the program instructions are further executable to implement:

modifying the first wire appearance in response to user input, wherein said modifying produces a modified first wire appearance; and displaying the first wire between the first icon and the second icon with the modified first wire appearance in response to said modifying.

4. The memory medium of claim 2, wherein the first wire appearance is inheritable, and wherein the program instructions are further executable to implement:

specifying a second communication functionality between nodes in a graphical program in response to user input, wherein the second communication functionality is derived from the first communication functionality;

including a third icon and a fourth icon in a second graphical program, wherein the third icon and the fourth icon are configured to communicate in accordance with the second communication functionality, wherein said including comprises:
   connecting the third icon to the fourth icon in response to user input; and
   displaying a second wire between the third icon and the fourth icon in response to said connecting, wherein the second wire has the first wire appearance.

5. The memory medium of claim 4, wherein the program instructions are further executable to implement:

modifying the first wire appearance for the second communication functionality in response to user input; and displaying the second wire between the third icon and the fourth icon in response to said modifying, wherein the wire has the modified first wire appearance.

6. The memory medium of claim 2, wherein the first wire appearance is inheritable, and wherein the program instructions are further executable to implement:

specifying a second communication functionality between nodes in a graphical program in response to user input, wherein the second communication functionality is derived from the first communication functionality;

creating a second wire appearance for the second communication functionality in response to user input;

including a third icon and a fourth icon in a second graphical program, wherein the third icon and the fourth icon are configured to communicate in accordance with the second communication functionality, wherein said including comprises:
   connecting the third icon to the fourth icon in response to user input; and
   displaying a second wire between the third icon and the fourth icon in response to said connecting, wherein the second wire has the second wire appearance.

7. The memory medium of claim 2, wherein the first graphical program comprises a block diagram portion comprising the plurality of interconnected icons, and a user interface portion.

8. The memory medium of claim 2, wherein the first graphical program comprises a graphical data flow program.

9. The memory medium of claim 1, wherein said creating the first wire appearance comprises:

displaying a graphical user interface on the display; and receiving user input to the graphical user interface specifying the first wire appearance for the first communication functionality.

10. The memory medium of claim 9, wherein said specifying the first wire appearance for the first communication functionality comprises specifying one or more of:

a wire pattern;
a wire thickness;
a wire shape;
one or more wire colors; or
at least a portion of the wire to be configured with the first wire appearance.

11. The memory medium of claim 9, wherein said specifying the first wire appearance for the first communication functionality comprises specifying one or more of:

a wire label; or
a wire icon to be displayed on or proximate to the wire.

12. The memory medium of claim 1, wherein said specifying the first communication functionality between nodes comprises specifying a model of computation to be followed or implemented by the wire.

13. The memory medium of claim 1, wherein said specifying the first communication functionality between nodes comprises specifying functionality of at least one endpoint of the wire; and wherein the first wire appearance includes a specified appearance of a portion of the wire proximate to the at least one endpoint of the wire.

14. The memory medium of claim 1, wherein the first wire appearance is inheritable.

15. A method for configuring a wire appearance in a graphical program, the method comprising:

utilizing a computer to perform:

specifying a first communication functionality between nodes in a graphical program in response to user input defining a new communication functionality;

creating a first wire appearance for representing the first communication functionality in response to user input defining the first wire appearance, wherein said creating comprises storing the first wire appearance to be subsequently used for a wire that is configured to implement the first communication functionality, wherein the first communication functionality comprises one or more of:
  timing; or
  data transfer, comprising one or more of:
    data transfer semantics,
    a data transfer mechanism, or
    a data transfer medium, and
  subsequently displaying a first wire in a first graphical program, wherein the first wire has the first wire appearance, wherein the first wire is configured to implement the specified communication functionality, and wherein the first wire appearance visually denotes the specified communication functionality of the wire.

16. The method of claim 15, further comprising:
creating the first graphical program, wherein the first graphical program comprises a plurality of interconnected icons which visually indicate functionality of the first graphical program, including a first icon and a second icon, and wherein said creating the first graphical program comprises:
  connecting the first icon to the second icon in response to user input; and
  wherein said displaying the first wire comprises displaying the first wire between the first icon and second icon in response to said connecting.

17. The method of claim 16, wherein the first wire appearance is inheritable, the method further comprising:
  specifying a second communication functionality between nodes in a graphical program in response to user input, wherein the second communication functionality is derived from the first communication functionality;
  including a third icon and a fourth icon in a second graphical program, wherein the third icon and the fourth icon are configured to communicate in accordance with the second communication functionality, wherein said including comprises:
    connecting the third icon to the fourth icon in response to user input; and
    displaying a second wire between the third icon and the fourth icon in response to said connecting, wherein the second wire has the first wire appearance.

18. The method of claim 16, wherein the first wire appearance is inheritable, the method further comprising:
  specifying a second communication functionality between nodes in a graphical program in response to user input, wherein the second communication functionality is derived from the first communication functionality;
  creating a second wire appearance for the second communication functionality in response to user input;
  including a third icon and a fourth icon in a second graphical program, wherein the third icon and the fourth icon are configured to communicate in accordance with the second communication functionality, wherein said including comprises:
    connecting the third icon to the fourth icon in response to user input; and
    displaying a second wire between the third icon and the fourth icon in response to said connecting, wherein the second wire has the second wire appearance.

19. A system for configuring a wire appearance in a graphical program, the system comprising:
  a processor; and
  a memory medium coupled to the processor, wherein the memory medium stores program instructions which are executable by the processor to:
    specify a first communication functionality between nodes in a graphical program in response to user input defining a new communication functionality;
    create a first wire appearance for representing the first communication functionality in response to user input defining the first wire appearance, wherein said creating comprises storing the first wire appearance to be subsequently used for a wire that is configured to implement the first communication functionality, wherein the first communication functionality comprises one or more of:
      timing; or
      data transfer, comprising one or more of:
        data transfer semantics,
        a data transfer mechanism, or
        a data transfer medium, and
    subsequently display a first wire in a first graphical program, wherein the first wire has the first wire appearance, wherein the first wire is configured to implement the specified communication functionality, and wherein the first wire appearance visually denotes the specified communication functionality of the wire.

20. The system of claim 19, wherein the program instructions are further executable to:
  create the first graphical program, wherein the first graphical program comprises a plurality of interconnected icons which visually indicate functionality of the first graphical program, including a first icon and a second icon, and wherein said creating the first graphical program comprises:
    connecting the first icon to the second icon in response to user input; and
    wherein said displaying the first wire comprises displaying the first wire between the first icon and second icon in response to said connecting.

21. A system for configuring a wire appearance in a graphical program, the system comprising:
  means for specifying a first communication functionality between nodes in a graphical program in response to user input defining a new communication functionality;
  means for creating a first wire appearance for representing the first communication functionality in response to user input defining the first wire appearance, wherein said creating comprises storing the first wire appearance to be subsequently used for a wire that is configured to implement the first communication functionality, wherein the first communication functionality comprises one or more of:
    timing; or
    data transfer, comprising one or more of:
      data transfer semantics,
      a data transfer mechanism, or
      a data transfer medium, and
  means for subsequently displaying a first wire in a first graphical program, wherein the first wire has the first wire appearance, wherein the first wire is configured to implement the specified communication functionality, and wherein the first wire appearance visually denotes the specified communication functionality of the wire.

* * * * *